US012593751B2

(12) United States Patent (10) Patent No.: US 12,593,751 B2
Hunt (45) Date of Patent: Apr. 7, 2026

(54) AGRICULTURAL SYSTEM AND METHOD FOR MONITORING FEEDER THROUGHPUT OF A HARVESTER

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 759 days.

(21) Appl. No.: 17/963,363

(22) Filed: Oct. 11, 2022

(65) Prior Publication Data

US 2024/0114832 A1 Apr. 11, 2024

(51) Int. Cl.
*A01D 41/127* (2006.01)
*A01D 41/14* (2006.01)
*A01F 12/46* (2006.01)

(52) U.S. Cl.
CPC ....... *A01D 41/127* (2013.01); *A01D 41/1271* (2013.01); *A01D 41/141* (2013.01); *A01F 12/46* (2013.01)

(58) Field of Classification Search
CPC .............. A01D 41/1271; A01D 41/127; A01D 41/141; A01F 12/46
See application file for complete search history.

(56) References Cited

U.S. PATENT DOCUMENTS

| | | | | | |
|---|---|---|---|---|---|
| 5,855,108 | A | * | 1/1999 | Salz | A01D 75/182 |
| | | | | | 56/10.2 G |
| 6,119,442 | A | | 9/2000 | Hale | |
| 7,001,267 | B2 | * | 2/2006 | Behnke | A01D 41/127 |
| | | | | | 460/7 |
| 8,635,840 | B2 | | 1/2014 | Behnke | |
| 8,954,224 | B2 | | 2/2015 | Behnke et al. | |

(Continued)

FOREIGN PATENT DOCUMENTS

| | | | | | |
|---|---|---|---|---|---|
| CN | 117441493 | A | * | 2/2024 | ............. A01D 57/20 |
| CN | 118216297 | A | * | 6/2024 | ............. A01D 41/12 |

(Continued)

OTHER PUBLICATIONS

Extended European Search Report and Written Opinion for EP Application No. 23202942.1 dated Mar. 26, 2024 (nine pages).

*Primary Examiner* — Arpad Fabian-Kovacs
(74) *Attorney, Agent, or Firm* — Dority & Manning, P.A.

(57) ABSTRACT

An agricultural system for monitoring throughput of a feeder configured for use with a harvester performing a harvesting operation within a field includes a feeder housing and a feed assembly supported within the feeder housing, with the feed assembly directing a flow of harvested materials through the feeder, and with the feed assembly including a plurality of carriers spaced apart and driven about a loop. Moreover, the agricultural system includes a sensor configured to generate data indicative of the flow of harvested materials through the feeder. Additionally, the agricultural system includes a computing system communicatively coupled to the sensor, with the computing system being configured to monitor the flow of harvested materials based at least in part on the data generated by the sensor and a position of the plurality of carriers relative to the sensor.

20 Claims, 5 Drawing Sheets

(56)  References Cited

U.S. PATENT DOCUMENTS

| | | | | |
|---|---|---|---|---|
| 9,539,618 | B2 | 1/2017 | Aley et al. | |
| 9,648,807 | B2 | 5/2017 | Escher et al. | |
| 9,928,606 | B2 | 3/2018 | Roth et al. | |
| 10,412,889 | B2 | 9/2019 | Palla et al. | |
| 11,197,417 | B2 | 12/2021 | Corban et al. | |
| 2019/0246561 | A1* | 8/2019 | Neitemeier | A01D 41/127 |
| 2019/0343048 | A1* | 11/2019 | Farley | A01D 61/002 |
| 2020/0022309 | A1 | 1/2020 | Fries et al. | |
| 2021/0144919 | A1 | 5/2021 | Romoser | |
| 2023/0099971 | A1* | 3/2023 | Baumgarten | A01D 41/127 |
| | | | | 701/50 |
| 2023/0099974 | A1* | 3/2023 | Baumgarten | A01D 41/141 |
| | | | | 701/50 |
| 2024/0138296 | A1* | 5/2024 | Finley | A01B 79/02 |

FOREIGN PATENT DOCUMENTS

| | | | | | |
|---|---|---|---|---|---|
| DE | 4311054 | A1 * | 10/1994 | | A01D 41/1274 |
| DE | 102018212075 | A1 * | 1/2020 | | A01D 41/1271 |
| DE | 102022100749 | A1 | 7/2022 | | |
| EP | 2681984 | A1 * | 1/2014 | | A01D 57/02 |
| EP | 2143316 | B1 | 3/2019 | | |
| EP | 3566565 | A1 | 11/2019 | | |
| EP | 3981244 | A1 | 4/2022 | | |
| EP | 4205529 | A1 * | 7/2023 | | A01D 41/141 |
| EP | 4353071 | A1 * | 4/2024 | | A01D 61/008 |

* cited by examiner

AGRICULTURAL SYSTEM AND METHOD FOR MONITORING FEEDER THROUGHPUT OF A HARVESTER

FIELD OF THE INVENTION

The present disclosure relates generally to agricultural harvesters and, more particularly, to agricultural systems and methods for monitoring throughput of a feeder configured for use with an agricultural harvester.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

Typically, the settings of the crop processing system are controlled based on a yield estimate generated after the crop has been at least partially processed by the crop processing system. However, if there is a sudden increase in the crop being received from the header, the crop processing system may not be able to adjust quickly enough to properly process the increased amount of crop, which may cause crop losses to occur. Similarly, if there is a sudden drop in the crop being received from the header, the crop processing system may not be cleaning the crop as aggressively as it could, which generally lowers the cleaning efficiency of the harvester, or the processing speed may be lower than necessary, which means that the harvesting operation takes longer than necessary.

Accordingly, an agricultural system and method for monitoring throughput of a feeder configured for use with an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for monitoring throughput of a feeder configured for use with a harvester performing a harvesting operation within a field. The agricultural system may include a feeder housing and a feed assembly supported within the feeder housing, with the feed assembly being configured to direct a flow of harvested materials through the feeder, and with the feed assembly including a plurality of carriers spaced apart and drivable about a loop. Moreover, the agricultural system may include a sensor configured to generate data indicative of the flow of harvested materials through the feeder. Additionally, the agricultural system may include a computing system communicatively coupled to the sensor, with the computing system being configured to monitor the flow of harvested materials based at least in part on the data generated by the sensor and a position of the plurality of carriers relative to the sensor.

In another aspect, the present subject matter is directed to an agricultural method for monitoring throughput of a feeder configured for use with a harvester performing a harvesting operation within a field, where the feeder may include a feeder housing and a feed assembly supported within the feeder housing, with the feed assembly including a plurality of carriers spaced apart and drivable about a loop. The agricultural method may include controlling the feed assembly to drive the plurality of carriers about the loop to direct a flow of harvested materials through the feeder. Further, the agricultural method may include determining, with a computing system, a position of the plurality of carriers relative to a sensor as the plurality of carriers is driven about the loop. Moreover, the agricultural method may include receiving, with the computing system, data generated by the sensor, where the data is indicative of the flow of harvested materials. Additionally, the agricultural method may include monitoring, with the computing system, the flow of harvested materials based at least in part on the data generated by the sensor and the position of the plurality of carriers relative to the sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
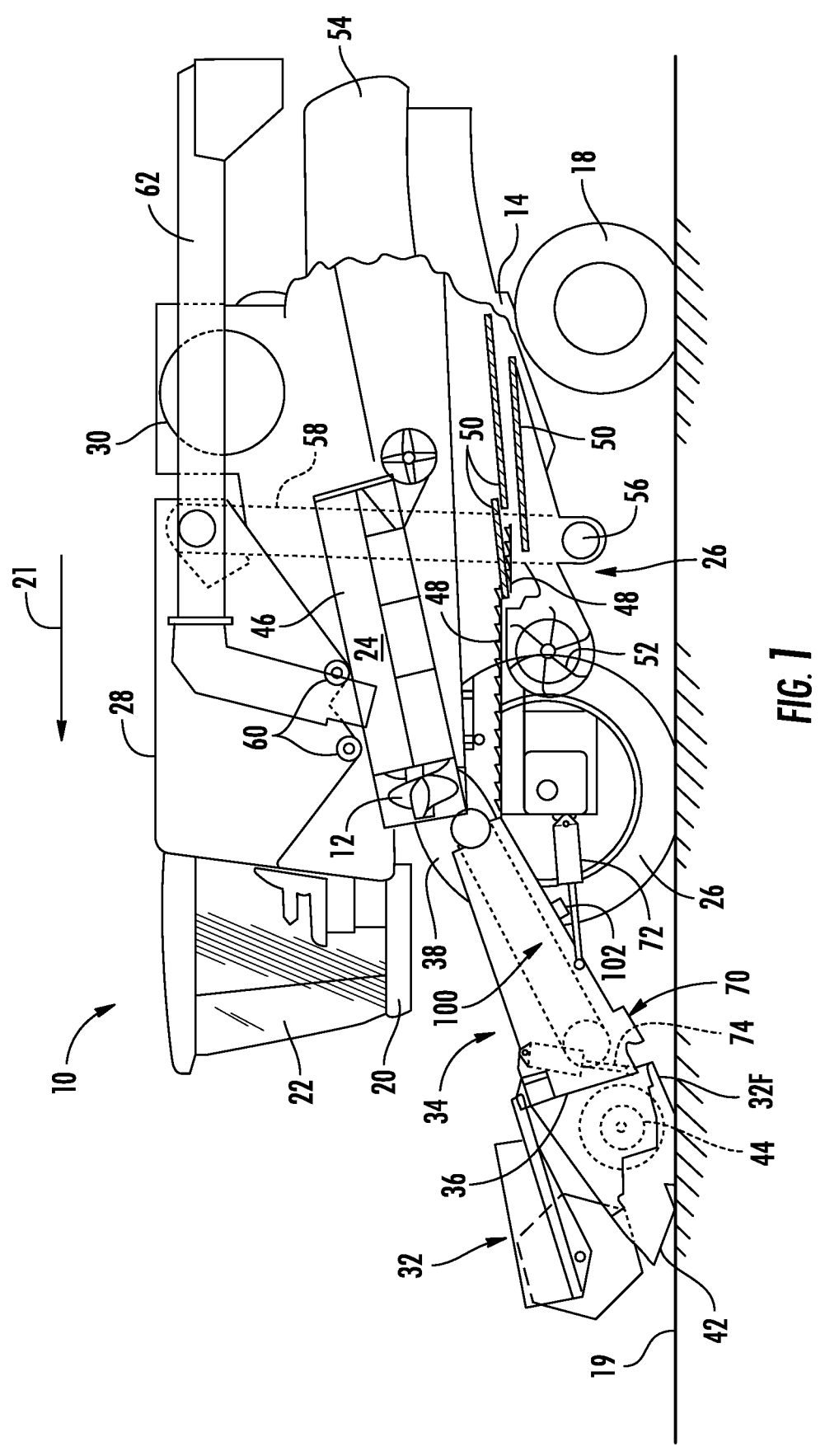
FIG. 1 illustrates a simplified, partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for determining feeder throughput of a feeder of an agricultural harvester. Specifically, in several embodiments, the disclosed system includes a feeder of the agricultural harvester, the feeder having a feeder housing and a feed assembly positioned within the feeder housing and configured to direct a flow of harvested materials through the feeder of the harvester. For instance, the feed assembly may include a plurality of carriers (e.g., slats) spaced apart and drivable along a loop. Generally, the harvested materials may be pushed by a leading side of the carriers from a front end of the feeder to a rear end of the feeder as the carriers are driven around the loop. As such, usually, the highest density of the harvested materials is at the leading side of the carriers, and the density of the harvested materials decreases further from the leading side of the carriers, towards a trailing side of a respective preceding carrier along the loop. The disclosed system may further include one or more sensors (e.g., cameras) having a field of view directed toward the flow of harvested materials directed through the feeder. For instance, the sensor(s) may generate data indicative of the harvested materials directed through the header, such as the volume of the harvested materials, the composition of the harvested materials (e.g., crop, material other than grain (MOG), and/or the like), a distribution of the harvested materials across a lateral width of the feeder, and/or a quality of the harvested materials (e.g., cracked kernels).

In some instances, the sensor(s) may have a maximum rate for generating the data that is slower than the rate at which the carriers of the feed assembly pass the sensor(s). However, in some instances, the sensor(s) may continuously capture data. In both instances, at least some of the data generated may correspond mainly to the carriers instead of the flow of harvested materials, which may skew analysis of the actual flow of harvested materials. As such, in accordance with aspects of the present subject matter, a computing system of the disclosed system may be configured to monitor the flow of harvested materials based at least in part on the data generated by the sensor and a position of the plurality of carriers relative to the sensor. For instance, the data monitored may be associated with intervals of a particular number of carriers passing through a field of view of the sensor(s) (e.g., data generated after each full revolution of the carriers about the loop). In some instances, the data monitored may include both data associated with leading sides of the carriers entering the field of view of the sensor(s) and data associated with trailing sides of the carriers leaving the field of view of the sensor(s), such that there is an average of the flow of harvested materials between the highest density and lowest density areas. In some instances, the data monitored is associated with a midpoint between directly adjacent carriers being within the field of view of the sensor(s), such that there is an average of the flow of harvested materials between the highest density and lowest density areas. In one instance, such as when the overall volume of the flow of harvested materials is low, the data monitored is associated with only the leading side of the carriers entering the field of view of the sensor(s), so that only the highest density areas are monitored to allow a majority of the harvested materials to be analyzed.

By monitoring data generated by the sensor(s) according to the position of the carriers as described herein, the estimations of the flow of harvested material are more accurate.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26, and a holding tank 28 may be supported by the frame 14. As is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as a support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

Figure 4:
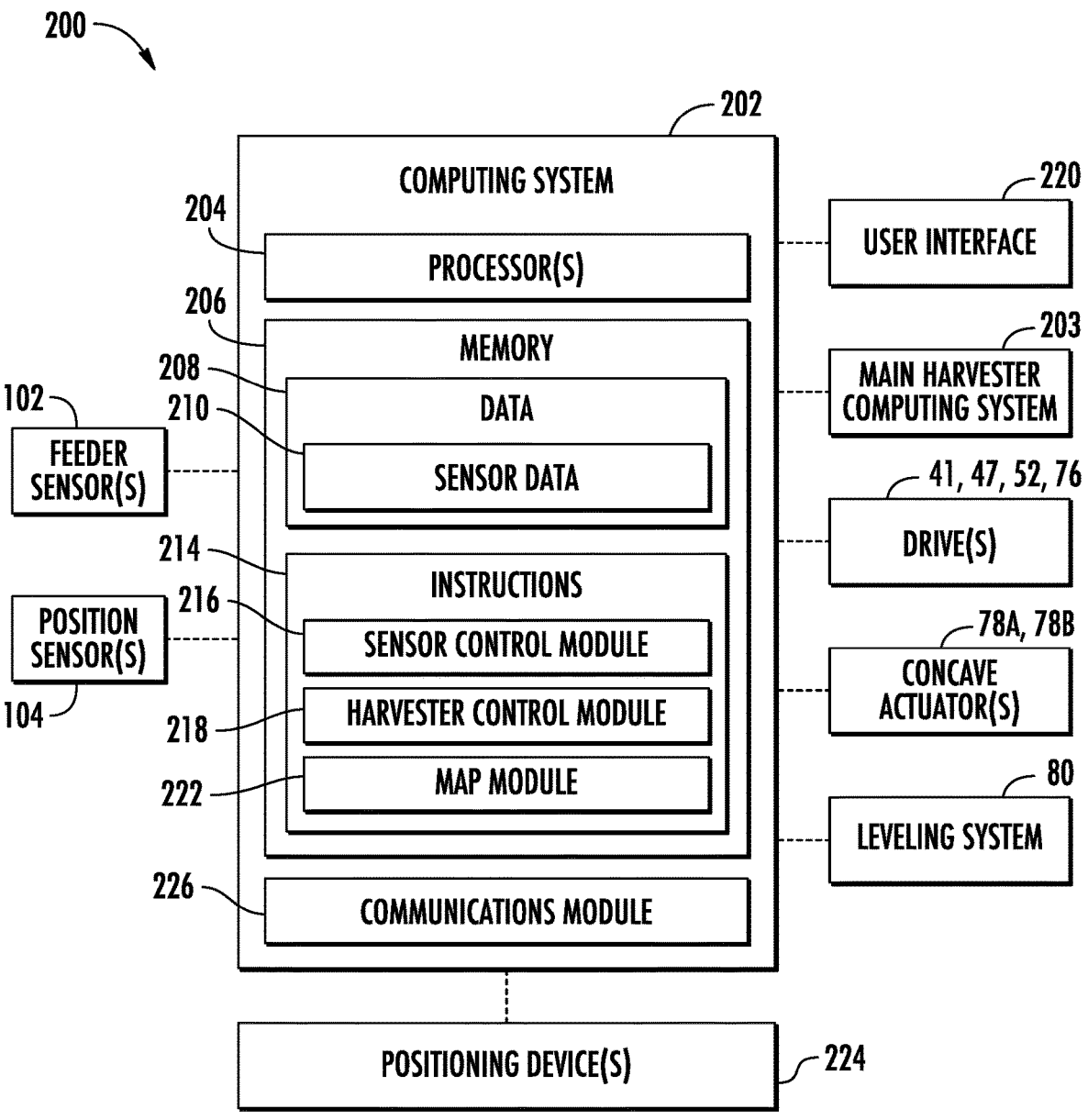
FIG. 4 illustrates a schematic view of a system for monitoring a throughput of a feeder for use with an agricultural harvester in accordance with aspects of the present subject matter.

As the harvester 10 is propelled forwardly over a field with standing crop, the crop material is severed from the stubble by a sickle bar 42 at the front of the header 32 and delivered by a material transfer device 44 (e.g., a header auger, a header conveyor, etc.) to the front end 36 of the feeder 34, which supplies the cut crop to the threshing and separating assembly 24. As is generally understood, the threshing and separating assembly 24 may include a cylindrical chamber or concave rotor cage 46 (hereinafter referred to as "concave 46") in which the rotor 12 is rotated by a rotor drive 76 (FIG. 4) to thresh and separate the crop received therein. That is, the crop is rubbed and beaten between the rotor 12 and the inner surfaces of the concave 46, whereby the grain, seed, or the like, is loosened and separated from the straw or MOG. In some embodiments, a position of the concave 46 about the rotor axis (e.g., a distance from the rotor axis) may be adjustable by one or more first concave actuators 78A (FIG. 4) and/or an angle of vanes (not shown) within the concave 46 may be adjustable by one or more second concave actuators 78B (FIG. 4).

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10. In some embodiments, a leveling system 80 (FIG. 4) may be provided for adjusting the lateral positioning of the cleaning assembly 48, 50. For instance, when the agricultural harvester 10 is on a hill such that one lateral side of the agricultural harvester 10 is positioned higher than its other lateral side, one or more actuators of the leveling system 80 may adjust the lateral positioning or angle of the pans 48 and/or the sieves 50 to counteract such sloping and keep the pans 48 and sieves 50 level.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 70 which is configured to adjust a height of the header 32 relative to the ground surface 19 so as to maintain the desired cutting height between the header 32 and the ground surface 19. The hydraulic system 70 may include a height actuator 72 (e.g., a fluid-actuated cylinder) configured to adjust the height or vertical positioning of the header 32 relative to the ground. For example, in some embodiments, the height actuator 72 may be coupled between the feeder 34 and the frame 14 such that the height actuator 72 may pivot the feeder 34 to raise and lower the header 32 relative to the ground 19. In addition, the hydraulic system 70 may include a tilt actuator(s) 74 (e.g., a fluid-actuated cylinder) coupled between the header 32 and the feeder 34 to allow the header 32 to be tilted relative to the ground surface 19 or pivoted laterally or side-to-side relative to the feeder 34.

Additionally, in accordance with aspects of the present subject matter and as will be described in greater detail below, a sensor assembly 100 may include one or more sensors 102 associated with the feeder 34, where each sensor 102 is configured to generate data indicative of the flow of harvested materials directed through the feeder 34 by a feed assembly 35, such as feeder throughput and/or the composition, distribution, quality, etc. of the flow of harvested materials. Using at least the feeder throughput of the harvested materials directed through the feeder 34, adjustment(s) may be made to the operation of the harvester 10 to reduce crop losses and improve efficiency of the crop processing operations.

Figure 2:
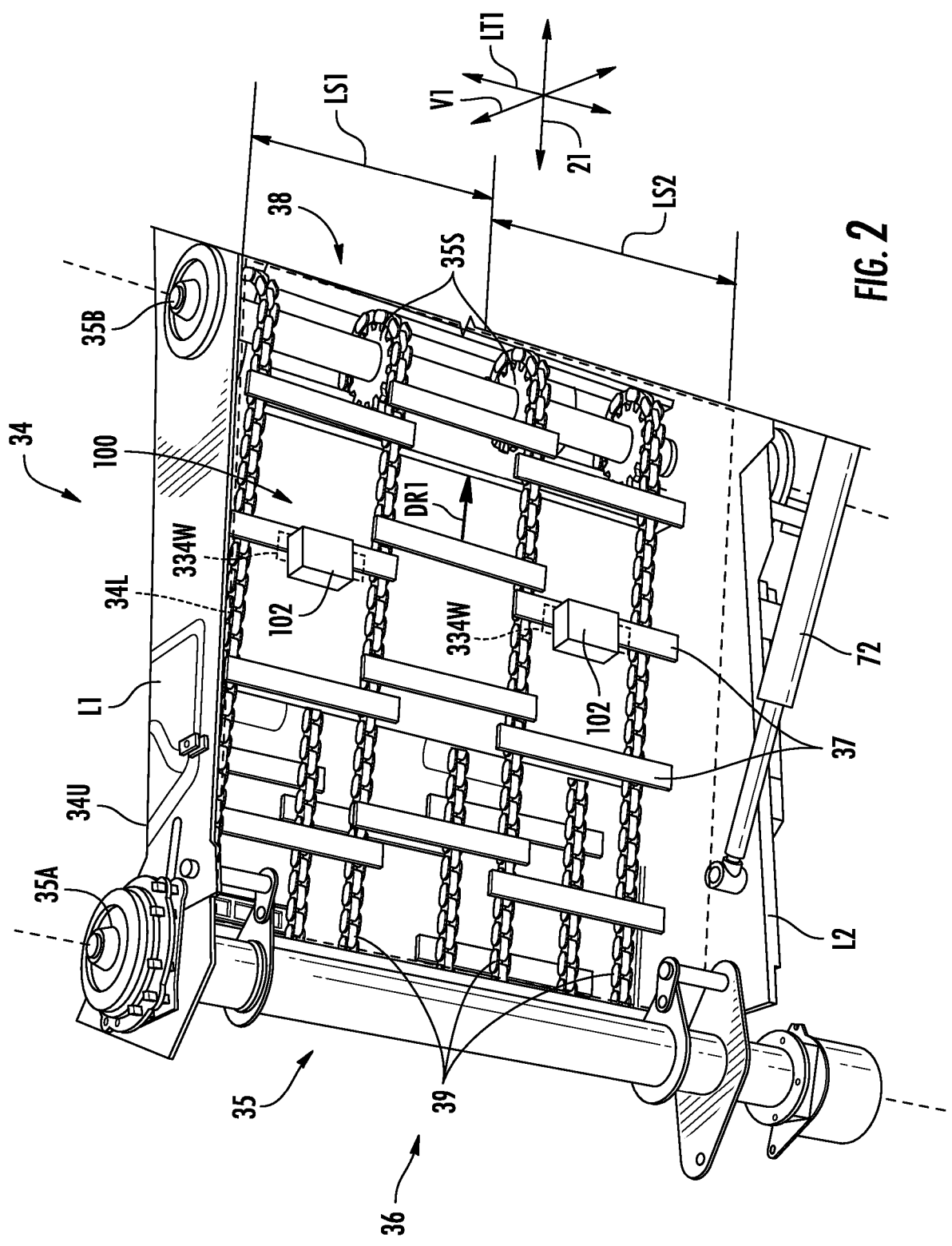
FIG. 2 illustrates a detail view of various components of a feeder of an agricultural harvester in accordance with aspects of the present subject matter, particularly illustrating a feed assembly within a feeder housing of the feeder, and a sensor assembly associated with the feeder for monitoring a throughput of the feeder.
Figure 3A:
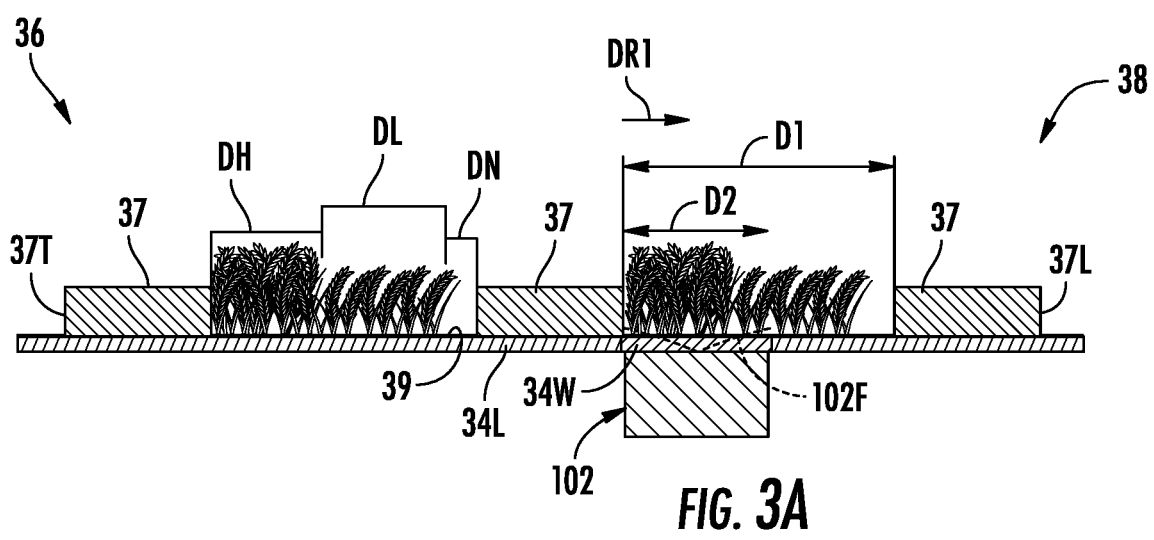
FIGS. 3A-3C illustrate schematic views of different positions of the feed assembly relative to the sensor assembly shown in FIG. 2 for monitoring the throughput of the feeder in accordance with aspects of the present subject matter.
Figure 3B:
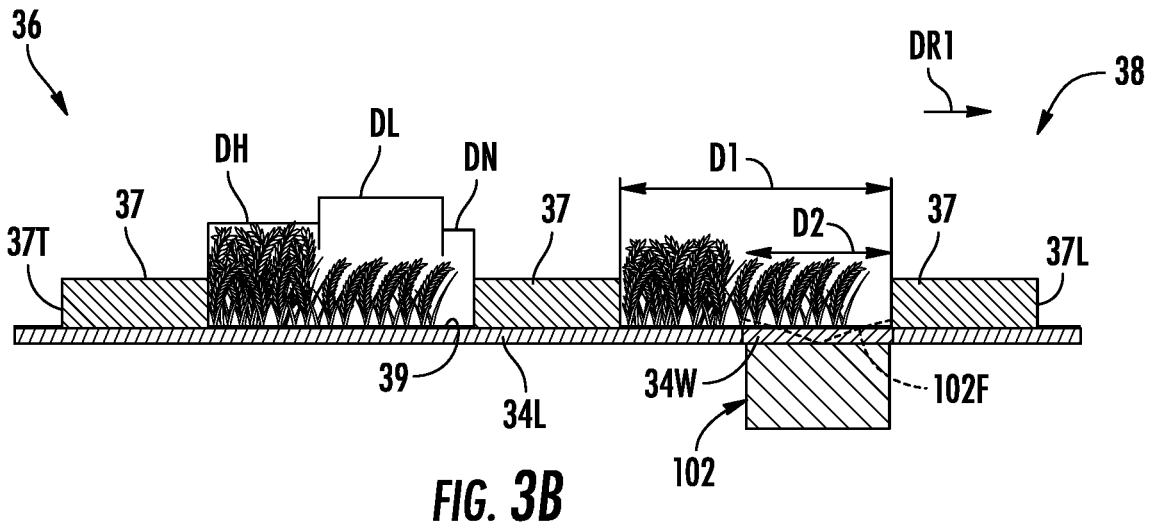
Figure 3C:
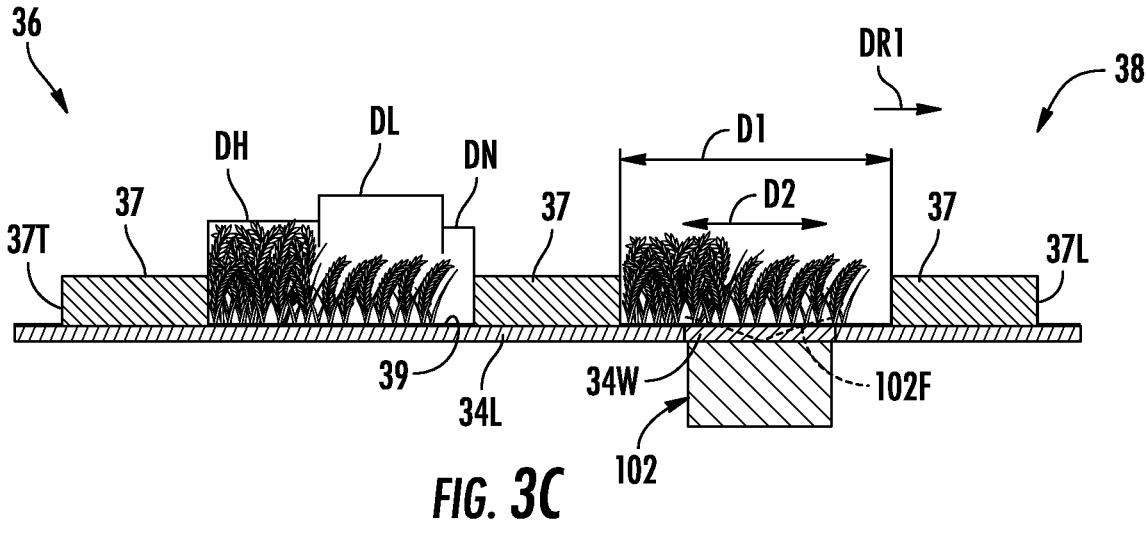

Referring now to FIG. 2, a detail view of various components of the feeder 34 of the agricultural harvester 10 is illustrated in accordance with aspects of the present subject matter, particularly illustrating the feed assembly 35 and the sensor assembly 100 associated with the feeder 34. As shown in FIG. 2, the feeder 34 has a housing that generally extends along the direction of travel 21 between the front end 36 and the rear end 38, along a lateral direction LT1 perpendicular to the direction of travel 21 between a first lateral side L1 and a second lateral side L2, and along a vertical direction V1 perpendicular to both the direction of travel 21 and the lateral direction LT1 between an upper wall 34U and a lower wall 34L (shown transparently). The feed assembly 35 is positioned at least partially within the feeder housing and includes drive members, including a first rotational shaft 35A and a second rotational shaft 35B. Each of the rotational shafts 35A, 35B generally extends along or parallel to the lateral direction LT1 and is rotatable about a respective rotational axis similarly extending along or parallel to the lateral direction LT1, with the rotational shafts 35A, 35B being spaced apart along the direction of travel 21. The feed assembly 35 further includes a plurality of carriers 37, such as slats, configured to be driven about a continuous loop defined by chains 39 extending around sprockets 35S fixed to the rotational shafts 35A, 35B. The carriers 37 are spaced apart along the chains 39 by a distance D1 (FIGS. 3A-3C). The carriers 37 collectively extend across substantially all of a lateral width of the feeder 34 in the lateral direction LT1. In some instances, each of the carriers 37 only extends across a portion of the lateral width of the feeder 34 in the lateral direction LT1. For example, as shown in FIG. 2, each of the carriers 37 extends across about one-third of the lateral width of the feeder 34 in the lateral direction LT1, with the carriers 37 at least partially overlapping along the lateral direction LT1 such that the carriers 37 collectively extend across substantially all of the lateral width of the feeder 34. However, it should be appreciated that, in other embodiments, each of the carriers 37 may extend across an entire lateral width of the feeder 34.

When the rotational shaft(s) 35A, 35B are driven to rotate (e.g., by shaft drive(s) 41 (FIG. 4)), the chains 39 are driven by the sprockets 35S fixed to the shafts 35A, 35B, thereby driving the carriers 37 about the loop. Preferably, the rotational shafts 35A, 35B are driven such that the carriers 37 closer to the lower wall 34L of the feeder move from the front end 36 of the feeder 34 towards the rear end 38 of the feeder 34 (e.g., as shown with arrow DR1, generally parallel to the direction of travel 21), while the carriers 37 closer to the upper wall 34U of the feeder 34 move from the rear end 38 of the feeder 34 towards the front end 36 of the feeder. Thus, as the carriers 37 are driven about the loop, harvested materials entering the front end 36 of the feeder 34 are pushed along the lower wall 34L of the feeder 34 towards the rear end 38 of the feeder 34 by the carriers 37 moving along the lower wall 34L in the direction DR1.

To monitor the flow of harvested materials being moved through the feeder 34 by the feed assembly 35, the feeder 34 includes a sensor assembly 100. In several embodiments, the sensor assembly 100 includes one or more sensors 102 configured to generate data indicative of the flow of harvested materials through the feeder 34. For example, each of the sensor(s) 102 may have a field of view directed towards the flow of harvested materials through the feeder 34. More particularly, in some embodiments, the sensor(s) 102 is coupled to or otherwise supported on the lower wall 34L of the feeder 34 with its field of view being directed generally upward along the vertical direction V1, from vertically below the feed assembly 35. For instance, in one embodiment, at least one window 34W is positioned within the lower wall 34L, with the sensor(s) 102 being coupled to the lower wall 34L on an exterior of the feeder 34 such that the field of view of the sensor(s) 102 is directed through the window(s) 34W into the feeder 34. However, in other embodiments, the sensor(s) 102 may be alternatively, or additionally, positioned at any other suitable location such that its field of view is directed towards the flow of harvested material through the feeder 34.

The field of view of the sensor(s) 102 may extend across lateral sections less than or equal to the lateral width of the feeder 34. In some embodiments, the field of view of the sensor(s) 102 may be configured to extend across lateral sections extending collectively along at least a portion of the lateral width of the feeder 34. For instance, in one embodiment, the field of view of the sensor(s) 102 may collectively extend across at least 50% of the lateral width of the feeder 34, such as at least 75% of the lateral width of the feeder, and/or the like. In some embodiments, the field of view of the sensor(s) 102 may collectively extend across the entire lateral width of the feeder 34. As such, the data generated by the sensor(s) 102 may also be indicative of a distribution of the flow of harvested materials across at least a portion of the lateral width of the feeder 34.

In the illustrated embodiment of FIG. 2, two sensors 102 are shown as forming part of the sensor assembly 100, each having a field of view less than the lateral width of the feeder 34. Particularly, one of the sensor(s) 102 has a field of view directed towards a first lateral section LS1 of the lateral width of the feeder 34, while the other of the sensor(s) 102 has a field of view directed towards a second lateral section LS2 of the lateral width of the feeder 34. The first lateral section LS1 extends from the first lateral side L1 to an intermediate lateral location along the lateral direction LT1, while the second lateral section LS2 extends from the second lateral side L2 to the intermediate lateral location. As such, the sensor 102 with the field of view directed toward the first lateral section LS1 may be configured to generate data indicative of the flow of harvested materials through the first lateral section LS1 of the feeder 34, while the sensor 102 with the field of view directed toward the second lateral section LS2 may be configured to generate data indicative of the flow of harvested materials through the second lateral section LS2. It should be appreciated that, in some instances, the intermediate lateral location is a center of the feeder 34 along the lateral direction LT1. However, the intermediate lateral location may be any other suitable location along the lateral direction LT1. In one embodiment, the lateral sections LS1, LS2 do not overlap. However, it should be appreciated that, in other embodiments, the lateral sections LS1, LS2 may at least partially overlap. Additionally, it should be appreciated that in some embodiments, the lateral sections are spaced apart from each other along the lateral direction LT1.

It should be appreciated that the sensor(s) 102 may be configured as any suitable sensor(s). For instance, in one embodiment, the sensor(s) 102 may be configured as a non-contact sensor(s), including a vision-based sensor(s) (e.g., a camera(s), a light detection and ranging (lidar) device(s)/sensor(s), and/or a radio detection and ranging (radar) sensor(s)), having a field of view directed towards the flow of harvested materials directed through the feeder 34 such that the sensor(s) 102 generates suitable data (e.g., image data, radar data, point-cloud data, infrared data, and/or the like) indicative of the amount of harvested materials directed through the feeder 34. It should also be appreciated that, although two of the sensors 102 are shown in FIG. 2, any suitable number of the sensor(s) 102 may instead be used. For instance, in one embodiment, one, three, four, or more of the sensor(s) 102 may be provided in association with the feeder 34. It should additionally be appreciated that the feeder 34 may have any other suitable feed assembly for directing the flow of crop materials through the feeder 34 instead of, or in addition to, the feed assembly 35, such as a conveyor belt to which the carriers 37 are coupled or are integrally molded with, and/or the like.

As will be described in greater detail below, a computing system of the disclosed system may be configured to monitor data generated by the sensor(s) 102 based at least in part on the position of the carriers relative to the sensor(s) 102. For instance, in general, data corresponding mainly to the carriers instead of the flow of harvested materials, such as when an entire carrier, from a leading side to a trailing side along the direction DR1, is in the field of view of the sensor(s) 102, may lead to inaccurate estimation of the flow of harvested materials. In some instances, the maximum rate (e.g., frame rate) at which the sensor(s) 102 may generate the data may be less than a rate at which carriers 37 pass the sensor(s) 102, which leads to some of the data corresponding mainly to the carriers 37 instead of to the flow of harvested materials. However, in some instances, the sensor(s) 102 may continuously capture data, which also leads to some of the data corresponding mainly to the carriers 37 instead of to the flow of harvested materials. Accordingly, it may be beneficial to only monitor the data corresponding to particular positions of the carriers relative to the sensor(s) 102.

Thus, referring now to FIGS. 3A-3C, schematic views of different positions of the feed assembly relative to the sensor assembly 100 shown in FIG. 2 for monitoring the throughput of the feeder are illustrated in accordance with aspects of the present subject matter. Generally, as the carriers 37 closest to the lower wall 34L of the feeder housing are driven by the chain 39 in the direction DR1, a leading side 37L of the carriers 37 is positioned closer to the rear end 38 of the feeder 34 than a trailing side 37T of the carriers 37. The harvested materials are pushed by the leading side 37L of the carriers 37 along the lower wall 34L from the front end 36 of the feeder 34 to the rear end 38 of the feeder 34. The density of the harvested materials is generally the highest at the leading side 37L of the carriers 37 and the density of the harvested materials decreases with increasing distance from the leading side 37L of the carriers 37, closer to the trailing side 37T of a nearest preceding carrier 37 along the chain 39. In some instances, there is a void of harvested materials between carriers 37, such as at the trailing side 37T of the carriers 37. For example, a higher density of the harvested materials is shown within bracket DH, a lower density of the harvested materials is shown within bracket DL, and a void of harvested materials is shown within bracket DN.

The field of view 102F of each of the sensor(s) 102 is directed towards the flow of harvested materials being pushed by the carriers 37. For instance, as described above, the sensor(s) 102 may be fixed to the lower wall 34L of the feeder housing, on an exterior surface, with the field of view 102F of each of the sensor(s) 102 being directed through the window(s) 34W in the lower wall 34L. As such, the field of view 102F of each of the sensor(s) 102 is directed upwardly towards the flow of materials. The field of view 102F of the sensor(s) 102 extends along a sensing distance D2 in the direction DR1. In some embodiments, the sensing distance D2 is less than the spacing D1 between directly adjacent carriers 37 along the chain 39.

As indicated above, it may be beneficial to only monitor the data corresponding to particular positions of the carriers relative to the sensor(s) 102. For instance, it may be beneficial to only monitor data associated with the carriers 37 being substantially outside of the field of view 102F of the sensor(s) 102. For example, it may be beneficial to monitor data associated with a likely high-density area DH of the harvested materials. In such instances, each of the data points of the data monitored is associated with or generated when the leading side 37L of a respective one of the carriers 37 is within the field of view 102F while the trailing side 37T of the respective carrier 37 is outside of the field of view 102F, as shown in FIG. 3A. However, it should be appreciated that, the leading side 37L of the respective carrier 37 may instead be just outside of, or about to enter, the field of view 102F in some instances, such that the respective carrier 37 is completely out of the field of view 102F.

Similarly, in some embodiments, it may be beneficial to monitor data associated with a likely, low-density area DL, DN of the harvested materials. In such embodiments, each of the data points of the data monitored may be associated with or generated when the trailing side 37T of a respective one of the carriers 37 is within the field of view 102F while the leading side 37L of the respective carrier is outside of the field of view 102F, as shown in FIG. 3B. However, it should be appreciated that, the trailing side 37T of the respective carrier 37 may instead be just outside of, or about to leave, the field of view 102F in some instances, such that the respective carrier 37 is completely out of the field of view 102F.

In further embodiments, it may be beneficial to monitor both high density areas DH and low-density areas DL, DN of the harvested materials. For instance, to more accurately determine a MOG content, it is better to capture a wide distribution of the harvested materials between the carriers 37, as the MOG may travel differently between the carriers 37 than grain content. For example, in some embodiments, the data monitored may include a first set of data points and a second set of data points. Each of the first set of data points corresponds to when the leading side 37L of a respective one of the carriers 37 is within the field of view 102F and the trailing side 37T of the carrier 37 is outside of the field of view 102F, as in FIG. 3A. Similarly, each of the second set of data points corresponds to when the trailing side 37T of a respective one of the carriers 37 is within the field of view 102F and the leading side 37L of the carrier 37 is outside of the field of view 102F, as in FIG. 3B. Particularly, in some instances, a number of data points of the first set of data points may be equal to the number of data points of the second set of data points, such that the resulting data regarding the flow of harvested materials represents an average of the high density area DH and low density areas DL, DN.

In some embodiments, both high density areas DH and low-density areas DL, DN of the harvested materials are instead, or additionally, monitored by data, where each of the data points is associated with or generated when a midpoint between the leading side 37L of a first, respective one of the carriers 37 and a trailing side 37T of a respective, directly adjacent one of the carriers 37, preceding the first, respective one of the carriers 37 along the direction DR1, is within the field of view 102F of the sensor(s) 102, such as in FIG. 3C. In such embodiments, the carriers 37 may be completely outside of the field of view 102F. Using the data associated with the midpoint between directly adjacent carriers represents an average of the high density area DH and low density areas DL, DN.

Referring now to FIG. 4, a schematic view of one embodiment of a control system 200 for determining feeder throughput of a feeder of an agricultural harvester is illustrated in accordance with aspects of the present subject matter. In general, the control system 200 will be described herein with reference to the harvester 10 described with reference to FIG. 1, and the feeder 34 and the sensor assembly 100 described with reference to FIGS. 2-3C. However, it should be appreciated that the disclosed control system 200 may be used with any suitable agricultural work vehicle having any other suitable vehicle configuration, with any feeder having any other suitable feeder configuration, and/or with any sensor assembly having any other suitable sensor assembly configuration.

As shown, the control system 200 may include any combination of components of the harvester 10 described above with reference to FIGS. 1-3C. For instance, the system 200 may include: drives, such as the shaft drive(s) 41 for rotationally driving the rotational shaft(s) 35A, 35B, the auger drive 47 for rotationally driving the auger 44, a drive of the fan(s) 52 for providing the air flow through the sieves 50 that removes chaff and other impurities from the crop material, and the rotor drive 76 for controlling a rotational speed of rotor 12; the concave actuator(s) 78A, 78B for controlling the position of the concave 46 and/or angle of vanes of the concave 46; and the leveling system 80 for adjusting a position of the pans 48 and the sieves 50. The system 200 may further include the sensor(s) 102 for generating data indicative of the flow of harvested materials through the feeder 34.

Moreover, as shown in FIG. 4, the control system 200 may include a computing system 202 installed on and/or otherwise provided in operative association with the harvester 10. In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In one embodiment, the memory 206 of the computing system 202 may include one or more databases for storing information associated with the operation of the harvester 10, including data 208 associated with determining the feeder throughput of the feeder 34 of the harvester 10. For instance, as shown in FIG. 4, the memory 206 may include a sensor database 210 for storing data provided by the sensor(s) 102 that is associated with at least an amount of the flow of harvested materials through the feeder 34. Specifically, the computing system 202 may be communicatively coupled to each of the sensor(s) 102 to allow the data indicative of the harvested materials generated by the sensor(s) 102 (e.g., indicative of the volume, composition, distribution, quality, etc.) to be transmitted to the computing system 202. As such, the computing system 202 may be configured to continuously or periodically monitor and store the data indicative of the amount/distribution of the harvested materials for subsequent processing and/or analysis.

Referring still to FIG. 4, in several embodiments, the memory 206 of the computing system 202 may store instructions 214 that, when executed by the processor(s) 204, configure the computing system 202 to execute a sensor control module 216. For instance, the sensor control module 216 may be configured to control when each of the sensor(s) 102 generates the data for monitoring the feeder throughput. For example, as discussed above, in some instances, such as when the maximum rate at which the sensor(s) 102 may generate data is less than the rate at which the carriers 37 pass the sensor(s) 102, the data generated by the sensor(s) 102 (e.g., at the maximum rate) may include some data points that are associated mainly with the carriers 37 instead of the harvested material. Accordingly, in some embodiments, the sensor control module 216 may control the sensor(s) 102 to generate data based on the position of the carrier(s) 37 relative to the sensor(s) 102. In some embodiments, the sensor control module 216 may monitor the position of the carriers 37 relative to the sensor(s) 102 based at least in part on the speed at which the shaft drive(s) 41 rotate the shaft(s) 35A, 35B and/or based at least in part on position data generated by position sensor(s) 104 indicative of the position of carriers 37 relative to the sensor(s) 102. For instance, the position sensor(s) 104 may have a field of detection directed towards the carriers 37. In one embodiment, the position sensor(s) 104 may be positioned next to the sensor(s) 102 on the lower wall 34L such that the field of detection is also directed through the window(s) 34W. However, in other embodiments, the position sensor(s) 104 may be positioned at any other suitable location of the feeder 34. The position sensor(s) 104 may be an inductive sensor and/or a hall effect sensor. The position data generated by the position sensor(s) 104 may be stored within the sensor database 210. For instance, the position data generated by the position sensor(s) 104 may be correlated to the data generated by the sensor(s) 102. However, in other embodiments, the sensor control module 216 may monitor the position of the carriers 37 relative to the sensor(s) 102 based at least in part on the data generated by the sensor(s) 102. For instance, the sensor control module 216 may use a machine-learned model (e.g., a trained neural network) to determine the position of the carriers 37 relative to the field of view 102F of the sensor(s) 102, which may provide an even higher resolution or confidence in the position of the carriers 37 than using the position sensor(s) 104.

In one embodiment, the sensor control module 216 may control the sensor(s) 102 to generate data associated with or at intervals of a given number of the carriers 37 passing through the field of view 102F of the sensor(s) 102. For example, the sensor control module 216 may control the sensor(s) 102 to only generate data after every third carrier 37, every fourth carrier 37, a full set of carriers 37, and/or the like passes through the field of view 102F of the sensor(s) 102. The intervals may be timed based on the rotational speed of the shaft(s) 35A, 35B and/or based on the position data by the position sensor(s) 104 such that data associated with mainly carriers 37 is easily avoided. As such, the rate at which data is generated is generally proportional to the speed of the carriers 37.

As discussed above, in some embodiments, the sensor control module 216 may control the sensor(s) 102 to generate data associated with an average of high density regions DH and low density regions DL, DN of the harvested materials. For instance, in one embodiment, the sensor control module 216 may control the sensor(s) 102 to generate the first data points when high density regions DH are in the field of view 102F of the sensor(s) 102, as described above with reference to FIG. 3A, and the second data points when low density regions DL, DN are in the field of view

102F of the sensor(s) 102, as described above with reference to FIG. 3B, such that the first and second sets of data points generated by the sensor(s) 102 are indicative of an average of the high and low density regions DH, DL, DN. Alternatively, or additionally, in some embodiments, the sensor control module 216 may control the sensor(s) 102 to generate data when the midpoint between directly adjacent carriers 37 along the direction DR1 is within the field of view 102F of the sensor(s) 102, as described with reference to FIG. 3C such that the data generated by the sensor(s) 102 is indicative of an average of the high and low density regions DH, Dl, DN.

In one embodiment, when a volume of harvested materials is detected to be passing through the feeder 34 (e.g., determined based on the data from the sensor(s) 102) that is less than a threshold volume, most of the harvested materials may be located at the leading sides 37L of the carriers 37, with less than usual harvested materials within the typically low density areas DL. As such, the sensor control module 216 may control the sensor(s) 102 to switch to only generating data associated with the high density regions DH of the harvested materials, such as described above with reference to FIG. 3A, when the volume of harvested materials is less than the threshold volume. The threshold volume may be selected based at least in part on an expected volume for the harvesting process (e.g., based on data generated during previous agricultural operations in the field, such as planting or spraying) and/or in any other suitable manner. Accordingly, data indicative of sparse or empty regions between the carriers 37 is avoided, as sparse or empty regions do not provide value for determining volume, content, or quality of the flow of crop materials. In some instances, if no harvested materials are passing through the feeder 34, the sensor(s) 102 may be configured to generate data more infrequently. For instance, if no harvested materials are detected through the first lateral side L1 while harvested materials are detected through the second lateral side L2, the sensor(s) 102 associated with the first lateral side L1 may be controlled to generate data less frequently than the second lateral side L2, or to stop generating data for at least a period of time.

In other embodiments, however, when the sensor(s) 102 have a very high maximum rate for generating data, the sensor control module 216 may instead be configured to control the sensor(s) 102 to continuously capture data. In such embodiments, the data captured by the sensor(s) 102 is still monitored and stored with reference to the position of the carriers 37 determined based on the position data and/or the speed of the shaft drive(s) 41. The computing system 202 may be configured to only monitor certain data points from the continuously generated data, the certain data points being associated with certain positions of the carriers 37 relative to the sensor(s) 102, such as associated with intervals of a given number of carriers 37 passing through the field of view 102F of the sensor(s) 102, associated with substantially equal instances of high and low density regions of the harvested materials passing through the field of view 102F of the sensor(s) 102, associated with the midpoint between adjacent carriers 37 along the chain 39 passing through the field of view 102F of the sensor(s) 102, and/or only with high density regions of the harvested materials passing through the field of view 102F of the sensor(s) 102.

The memory 206 may further store instructions 214 that, when executed by the processor(s) 204, configure the computing system 202 to execute a harvester control module 218. For instance, the control module 218 may first be configured to determine the feeder throughput based at least in part on the sensor data 210. For example, based on the relative positioning between the carriers 37 and the sensor(s) 102 associated with the sensor data 210, appropriate correlations may be used to analyze the sensor data 210 to determine the feeder throughput. Generally, the greater the amount of harvested materials detected to be flowing through the feeder 34, the greater the feeder throughput. Moreover, in some embodiments, the control module 218 may be configured to determine the distribution of the harvested materials across the lateral width of the feeder 34 based at least in part on the sensor data 210. For instance, the field of view of the sensor(s) 102 may be correlated to the lateral width of the feeder 34 such that the distribution of the harvested materials across all or a portion of the lateral width of the feeder 34 may be determined based at least in part on the sensor data 210. Additionally, in some embodiments, the composition (e.g., percentage of crop, percentage of MOG, and/or the like) and/or the quality of the harvested crop (e.g., percentage of cracked kernels) may be determined based at least in part on the sensor data 210.

The control module 218 may be further configured to initiate a control action associated with controlling one or more components of or associated with the harvester 10. For instance, the control module 218 may generally be configured to control an operation of the auger drive 47 to drive the auger 44 to direct crop material through the header 32 to the front end 36 of the feeder 34. Similarly, the control module 218 may generally be configured to control an operation of the shaft drive(s) 41 to drive the rotational shaft(s) 35A, 35B to direct crop material through the feeder 34. Additionally, the control module 218 may be configured to initiate a control action associated with controlling one or more components of or associated with the harvester 10 based at least in part on the feeder throughput. For instance, the control module 218 may control an operation of the crop processing system to reduce crop losses and/or improve efficiency of the harvester 10 based at least in part on the feeder throughput. For example, the control module 218 may control the rotor drive 76 to adjust a rotational speed of the rotor 12, the concave actuator(s) 78A, 78B to adjust the concave 46 (e.g., a position of the concave 46 about the rotational axis of the rotor 12 and/or an angle of vanes of the concave 46), and/or the fan(s) 52 to adjust the air flow in response to the feeder throughput. For instance, in response to a change in the feeder throughput, the rotor drive 76 may be controlled to increase or decrease the rotational speed of the rotor 12; the first concave actuator(s) 78A may be controlled to move the concave 46 closer to the rotor 12 to increase an aggressiveness of the threshing and separating assembly; the second concave actuator(s) 78B may be controlled to change the degree of opening of the vanes of the concave 46 to create additional passes within the threshing and separating assembly; and/or the fan(s) 52 may be controlled to increase or decrease the air flow across the sieves 50.

Similarly, the control module 218 may be configured to control an operation of the leveling system 80 to adjust a positioning of the pans 48 and/or sieves 50 of the cleaning assembly in response to the distribution of harvested materials indicating that the flow of crop material is being focused towards one of the lateral sides of the feeder 34. For instance, if more crop material is detected toward the first lateral side L1 of the feeder 34, the leveling system 80 may be controlled to tilt the pans 48 and/or sieves 50 of the cleaning assembly such that the lateral side of the cleaning assembly proximate the first lateral side L1 of the feeder 34 is raised and/or the lateral side of the cleaning assembly proximate the second lateral side L2 of the feeder 34 is lowered. Conversely, if more crop material is detected toward the second lateral side L2 of the feeder 34, the leveling system 80 may be controlled to tilt the pans 48 and/or sieves 50 of the cleaning assembly such that the lateral side of the cleaning assembly proximate the second lateral side L2 of the feeder 34 is raised and/or the lateral side of the cleaning assembly proximate the first lateral side L1 of the feeder 34 is lowered.

It should be appreciated that the automated control of the different parts of the harvester 10 in response to the distribution of the crop loss may additionally take into account further operating factors of the harvester 10, such as crop type, moisture content, and/or the like.

Alternatively, or additionally, in some embodiments, the harvester control module 218 may be configured to control an operation of a user interface 220 associated with the agricultural harvester 10. In general, the user interface 220 may correspond to any suitable input device(s) configured to allow the operator to provide operator inputs to the computing system 202, such as a touch screen display, a keyboard, joystick, buttons, knobs, switches, and/or combinations thereof located within the cab 22 of the harvester 10. The operator may provide various inputs into the system 202 via the user interface 220. In one embodiment, suitable operator inputs may include, but are not limited to, a target rotor speed, a target concave position and/or vane angle, a lateral leveling of the cleaning assembly, and/or any other parameter associated with the harvester 10. In addition, the user interface 220 may also be configured to provide feedback (e.g., feedback associated with the feeder throughput) to the operator. As such, the user interface 220 may include one or more output devices (not shown), such as display screens, speakers, warning lights, and/or the like, which are configured to provide feedback from the computing system 202 to the operator. For example, the computing system 202 may control an operation of the user interface 220 to indicate to the operator of the harvester 10 the feeder throughput, the distribution of the crop materials across the lateral direction LT1 moving through the feeder 34, the composition of the harvested materials, the quality of the harvested materials, and/or suggested actions to reduce crop loss and/or improve efficiency based on the feeder throughput, distribution, composition, and/or quality of the crop materials moving through the feeder 34.

The instructions 214, when executed by the processor(s) 204, may further configure the computing system 202 to execute a map module 222. In general, the map module 222 may be configured to correlate the feeder throughput, or a parameter related to feeder throughput (e.g., yield, residue coverage, and/or the like), to different locations within the field. For instance, the computing system 202 may also be communicatively coupled with one or more positioning device(s) 224, such as a Global Positioning System (GPS) or another similar positioning device, configured to transmit a location corresponding to a position of the harvester 10 (e.g., of the feeder 34) within the field when the sensor data 210 is generated by the sensor(s) 102. The map module 222 may generate a feeder throughput map, a yield map, a residue coverage map, and/or the like, correlating the feeder throughput (or related parameter) to each position of the harvester 10 associated with each data point of the sensor data. The generated map(s) may be used to control subsequent agricultural operations within the field (e.g., tillage, planting, and/or the like).

It should be appreciated that the computing system 202 may also include various other suitable components, such as a communications circuit or module 226, a network interface, one or more input/output channels, a data/control bus and/or the like, to allow the computing system 202 to be communicatively coupled with any of the various other system components described herein.

Additionally, it should be appreciated that, in some embodiments, the computing system 202 is a feeder computing system configured to control operation of the feeder 34. In such embodiments, the feeder computing system 202 may be communicatively coupled to a main computing system 203 of the harvester 10 configured to control the operation of the crop processing system, trailing of the feeder 34, such as the operation of the rotor drive 76, the concave actuator(s) 78A, 78B, the fan(s) 52, and the leveling system 80, and, optionally, the user interface 220. The feeder computing system 202 and the main computing system 203 may be communicatively coupled in any suitable way. The feeder computing system 202 may be configured to receive the sensor data 210 from the sensor(s) 102, 104 and determine the feeder throughput. In some embodiments, the feeder computing system 202 may then communicate the feeder throughput to the main computing system 203, where the main computing system 203 may subsequently control the operation of the crop processing system and/or user interface 220 based at least in part on the feeder throughput as suggested above with reference to the harvester control module 218. Alternatively, or additionally, the feeder computing system 202 may control the operation of the crop processing system and/or user interface 220 via communication with the main computing system 203. It should be appreciated that by using the feeder computing system 202, the data processing load on the main computing system 203 may be reduced. It should additionally be appreciated that, due to the distance between the feeder 34 and the main computing system 203, it is easier to couple (e.g., with wires or wirelessly) the sensor(s) 102, 104 to the feeder computing system 202 and to couple (e.g., with wires or wirelessly) the computing systems 202, 203 than to couple (e.g., with wires or wirelessly) the sensor(s) 102, 104 directly to the main computing system 203.

Figure 5:
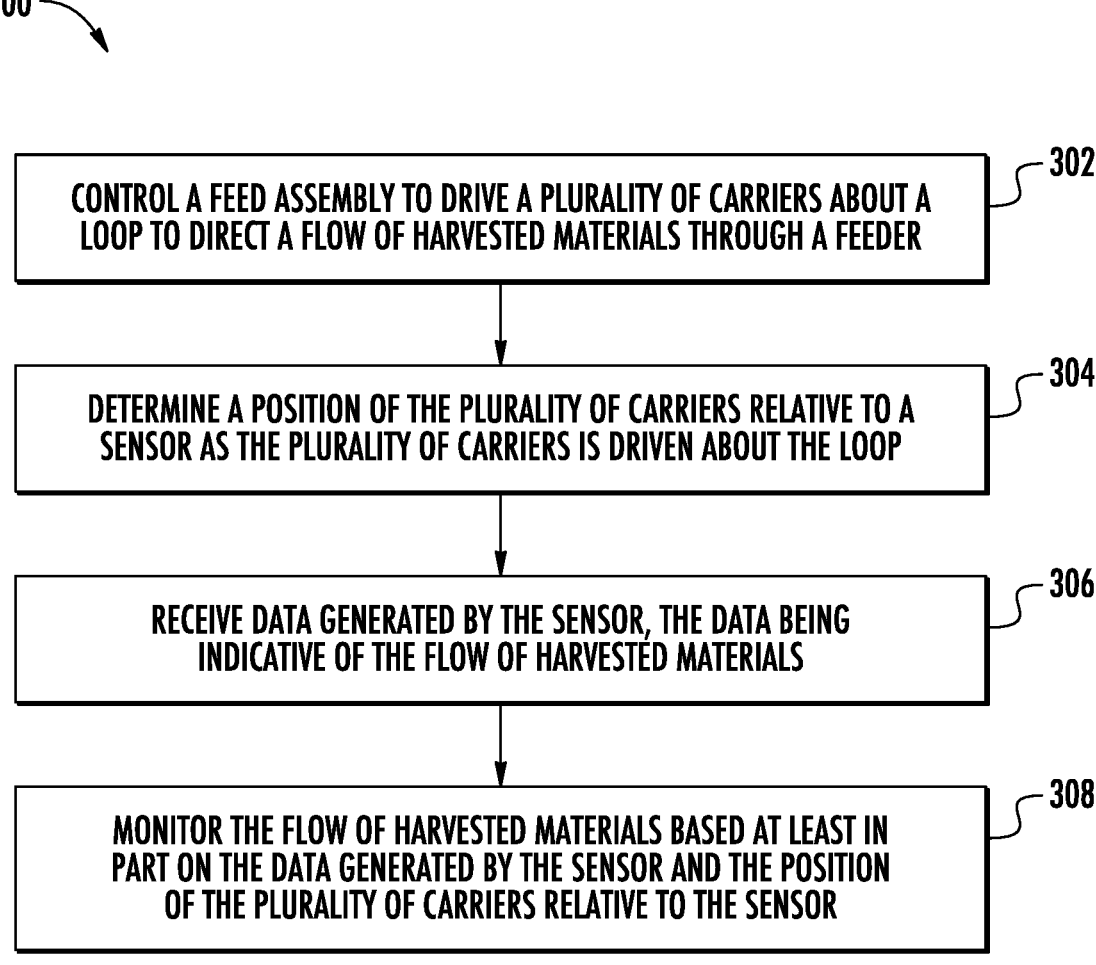
FIG. 5 illustrates a flow diagram of one embodiment of a method for monitoring a throughput of a feeder for use with an agricultural harvester in accordance with aspects of the present subject matter.

Referring now to FIG. 5, a flow diagram of one embodiment of a method 300 for determining feeder throughput of an agricultural harvester (e.g., harvester 10) is illustrated in accordance with aspects of the present subject matter. For purposes of discussion, the method 300 will generally be described herein with reference to the harvester 10 described with reference to FIG. 1, the sensor(s) 102 described with reference to the feeder 34 in FIGS. 2-3C, and the computing system 202 described with reference to FIG. 4. However, it should be appreciated that the disclosed method 300 may be used with any suitable agricultural work vehicle having any other suitable vehicle configuration, with a computing system having any other suitable system configuration, with any feeder having any other suitable feeder configuration, and/or with any other suitable sensor(s). Additionally, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 includes controlling a feed assembly to drive a plurality of carriers about a loop to direct a flow of harvested materials through a feeder. For instance, as described above, the feed assembly

35 (e.g., the shaft drive(s) 41 of the feed assembly 35) may be controlled to drive the plurality of carriers 37 about the loop defined by the chain 39 to direct the flow of harvested materials through the feeder 34.

Further, at (304), the method 300 includes determining a position of the plurality of carriers relative to a sensor as the plurality of carriers is driven about the loop. For example, as discussed above, the computing system 202 may monitor the position of the carriers 37 relative to the sensor(s) 102 supported on the lower wall 34L of the feeder housing of the feeder 34 as the carriers 37 are driven about the loop based on the rotational speed of the shaft drive(s) 41 and/or based on the position data generated by the position sensor(s) 104.

Moreover, at (306), the method 300 includes receiving data generated by the sensor, the data being indicative of the flow of harvested materials. For instance, as discussed above, the computing system 202 may receive the data generated by the sensor(s) 102 as the carriers 37 are driven about the loop, with the data being indicative of the flow of harvested materials.

Additionally, at (308), the method 300 includes monitoring the flow of harvested materials based at least in part on the data generated by the sensor and the position of the plurality of carriers relative to the sensor. For example, as described above, the computing system 202 may monitor the flow of harvested materials based at least in part on the data generated by the sensor(s) 102 and the position of the plurality of carriers 37 relative to the sensor(s) 102.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for monitoring throughput of a feeder of a harvester performing a harvesting operation within a field, the agricultural system comprising:

a feeder housing;

a feed assembly supported within the feeder housing, the feed assembly directing a flow of harvested materials through the feeder, the feed assembly including a plurality of carriers spaced apart and drivable about a loop for directing the flow of harvested materials;

a sensor generating data indicative of the flow of harvested materials through the feeder; and a computing system communicatively coupled to the sensor, the computing system monitoring the flow of harvested materials within the feeder based at least in part on the data generated by the sensor and a position of the plurality of carriers relative to the sensor during generation of the data.

2. The agricultural system of claim 1, further comprising a position sensor generating position data indicative of the position of at least one of the plurality of carriers relative to the sensor, wherein the computing system is monitoring the position of the plurality of carriers relative to the sensor based at least in part on the position data.

3. The agricultural system of claim 2, wherein the computing system is controlling the sensor to generate the data based at least in part on the position of the plurality of carriers relative to the sensor.

4. The agricultural system of claim 1, wherein the computing system is monitoring the position of the plurality of carriers relative to the sensor based at least in part on the data generated by the sensor.

5. The agricultural system of claim 1, wherein the computing system is monitoring the flow of harvested materials based at least in part on the data associated with intervals of a given number of the plurality of carriers passing through a field of view of the sensor.

6. The agricultural system of claim 1, wherein the computing system is monitoring the flow of harvested materials based at least in part on the data associated with a midpoint between directly adjacent carriers of the plurality of carriers about the loop being within a field of view of the sensor.

7. The agricultural system of claim 1, wherein the computing system is monitoring the flow of harvested materials based at least in part on a first set of data points and a second set of data points of the data, the first set of data points being associated with a leading side of a first carrier of the plurality of carriers being within a field of view of the sensor and a trailing side of the first carrier being outside of the field of view, the second set of data points being associated with a trailing side of a second carrier of the plurality of carriers being within the field of view and a leading side of the second carrier being outside of the field of view.

8. The agricultural system of claim 7, wherein a number of the first set of data points is equal to a number of the second set of data points.

9. The agricultural system of claim 1, wherein the computing system is monitoring the flow of harvested materials based at least in part on the data associated with a leading side of the plurality of carriers being within a field of view of the sensor and a trailing side of the plurality of carriers being outside of the field of view.

10. The agricultural system of claim 9, wherein the computing system is monitoring a volume of the flow of harvested materials based at least in part on the data, and wherein the computing system is monitoring the flow of harvested materials based at least in part on the data associated with the leading side of the plurality of carriers being within the field of view and the trailing side of the plurality of carriers being outside of the field of view in response to the volume of the flow of harvested materials being less than a threshold volume.

11. The agricultural system of claim 1, wherein the sensor comprises at least one of a camera, a radar sensor, or a lidar sensor.

12. An agricultural method for monitoring throughput of a feeder of a harvester performing a harvesting operation within a field, the feeder comprising a feeder housing and a feed assembly supported within the feeder housing, the feed assembly including a plurality of carriers spaced apart and drivable about a loop, the agricultural method comprising:

controlling the feed assembly to drive the plurality of carriers about the loop to direct a flow of harvested materials through the feeder;

determining, with a computing system, a position of the plurality of carriers relative to a sensor as the plurality of carriers is driven about the loop;

receiving, with the computing system, data generated by the sensor, the data being indicative of the flow of harvested materials within the feeder; and monitoring, with the computing system, the flow of harvested materials based at least in part on the data generated by the sensor and the position of the plurality of carriers relative to the sensor during generation of the data.

13. The agricultural method of claim 12, wherein determining the position of the plurality of carriers relative to the sensor comprises:

receiving, with the computing system, position data generated by a position sensor indicative of the position of at least one of the plurality of carriers relative to the sensor; and determining the position of the plurality of carriers relative to the sensor based at least in part on the position data.

14. The agricultural method of claim 13, further comprising controlling the sensor to generate the data based at least in part on the position of the plurality of carriers relative to the sensor.

15. The agricultural method of claim 12, wherein monitoring the flow of harvested materials comprises monitoring the flow of harvested materials based at least in part on the data associated with intervals of a given number of carriers of the plurality of carriers passing through a field of view of the sensor.

16. The agricultural method of claim 12, wherein monitoring the flow of harvested materials comprises monitoring the flow of harvested materials based at least in part on the data associated with a midpoint between directly adjacent carriers of the plurality of carriers about the loop being within a field of view of the sensor.

17. The agricultural method of claim 12, wherein monitoring the flow of harvested materials comprises monitoring the flow of harvested materials based at least in part on a first set of data points and a second set of data points of the data, the first set of data points being associated with an leading side of a first carrier of the plurality of carriers being within a field of view of the sensor and a trailing side of the first carrier being outside of the field of view, the second set of data points being associated with a trailing side of a second carrier of the plurality of carriers being within the field of view and a leading side of the second carrier being outside of the field of view.

18. The agricultural method of claim 12, wherein monitoring the flow of harvested materials comprises monitoring the flow of harvested materials based at least in part on the data associated with a leading side of the plurality of carriers being within a field of view of the sensor and a trailing side of the plurality of carriers being outside of the field of view.

19. The agricultural method of claim 18, further comprising monitoring a volume of the flow of harvested materials based at least in part on the data, wherein monitoring the flow of harvested materials comprises monitoring the flow of harvested materials based at least in part on the data associated with the leading side of the plurality of carriers being within the field of view of the sensor and the trailing side of the plurality of carriers being outside the field of view in response to the volume of the flow of harvested materials being less than a threshold volume.

20. The agricultural method of claim 12, further comprising initiating, with the computing system, a control action based at least in part on the data generated by the sensor.

\*    \*    \*    \*    \*